(No Model.)
W. W. NEWBERRY.
PLOW.
No. 532,333.   Patented Jan. 8, 1895.
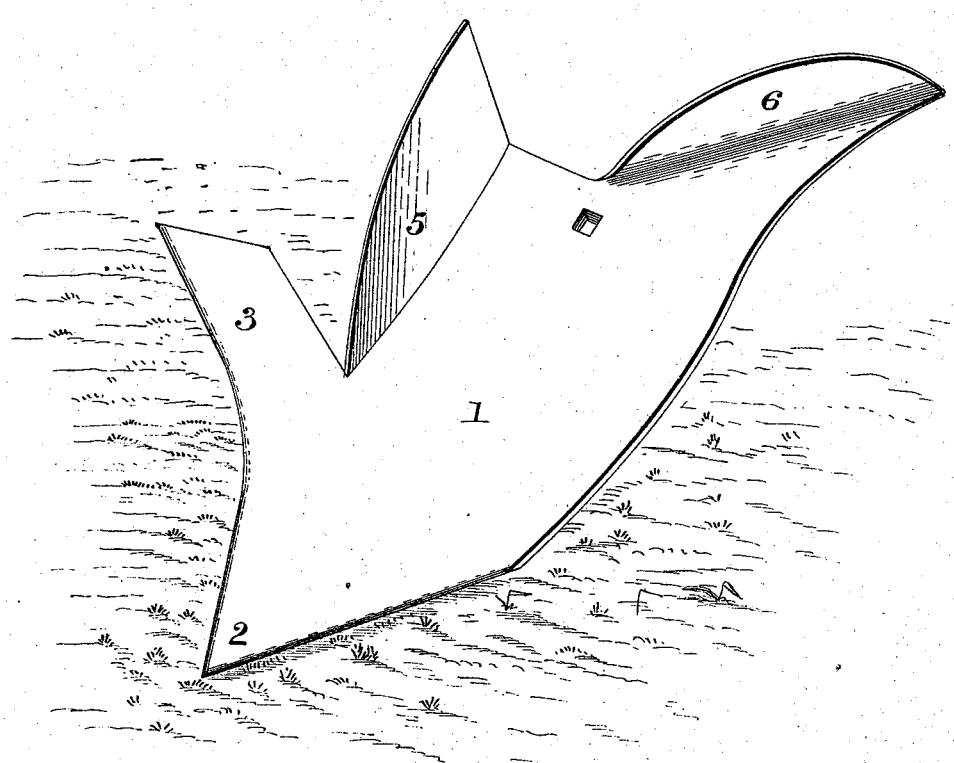
WITNESSES:
F. L. Durand.
Jo. L. Coombs
INVENTOR:
William W. Newberry.
G. Lewis Baggs &Co.
Attorneys

UNITED STATES PATENT OFFICE.

WILLIAM W. NEWBERRY, OF DOTHEN, ALABAMA.

PLOW.

SPECIFICATION forming part of Letters Patent No. 532,333, dated January 8, 1895.

Application filed February 7, 1894. Serial No. 499,388. (No model.)

*To all whom it may concern:*

Be it known that I, WILLIAM W. NEWBERRY, a citizen of the United States, and a resident of Dothen, in the county of Henry and State of Alabama, have invented certain new and useful Improvements in Plows; and I do hereby declare that the following is a full, clear, and exact description of the invention, which will enable others skilled in the art to which it appertains to make and use the same, reference being had to the accompanying drawing, which forms a part of this specification.

My invention relates to improvements in hoes or shovels for cotton cultivators, and its object is to provide an improved construction of the same, whereby the plants are sided up and the soil turned by the hoe or shovel thrown over to one side.

The invention consists in the novel construction and combination of parts hereinafter fully described and claimed.

In the accompanying drawing, the figure represents a perspective view of a cotton cultivator hoe or shovel constructed in accordance with my invention.

In the said drawing the reference numeral 1 designates the body of the hoe or shovel, made of iron, steel or other suitable metal; 2, the point; 3, a cutting wing on the right of the hoe, extending laterally outward and located above the point 2. Above this wing is a turner 5, bent upwardly at a right angle; and upon the opposite or left side of the hoe, at the top, there is a curved extension 6, for throwing the furrow outward.

The hoe or shovel is made from a single sheet or piece of metal by stamping or otherwise.

The manner of using my improved hoe or shovel will be readily understood. The hoe is secured to a cultivator standard by bolts or otherwise, as usual, and is run between the growing plants, the point loosening and turning up the soil and the turner, turned up at a right angle to the hoe, in conjunction with the curved extension throwing the furrow so turned over to the left of the cultivator.

The wing at the right of the hoe serves to "side up" the plants, while the turner above the point and turned up at right angles thereto, serves to "rope up" or turn the middle of the row, so that by passing the hoe—or plow—up one side and down the other side between two parallel rows of plants, the entire surface or space between the two rows of plants will have been worked.

While I have described my invention as being used in connection with a cotton cultivator, I do not desire to confine myself to such, as it may be employed with advantage to other styles of cultivators.

Having thus described my invention, what I claim is—

A cotton-cultivator, hoe, or shovel consisting of a single piece of suitable metal having the point 2, the "side-up" wing 3 on the right of the hoe, extending laterally outward and located above the point 2, the turner 5 bent upwardly at a right-angle at the top, and the extension 6, substantially as set forth.

In testimony that I claim the foregoing as my own I have hereunto affixed my signature in presence of two witnesses.

WILLIAM W. NEWBERRY.

Witnesses:
B. FAULK,
M. CODY.